J. B. McELROY.
Belt-Fastener.

No. 164,855. Patented June 22, 1875.

Witnesses:
W. F. Lippitt
P. M. Washington

Inventor:
J. B. McElroy

UNITED STATES PATENT OFFICE.

JOSIAH B. McELROY, OF CHARLESTOWN, WEST VIRGINIA.

IMPROVEMENT IN BELT-FASTENERS.

Specification forming part of Letters Patent No. 164,855, dated June 22, 1875; application filed July 28, 1874.

*To all whom it may concern:*

Be it known that I, JOSIAH B. MCELROY, of Charlestown, Jefferson county, and State of West Virginia, have invented a Solid Eye and Lock-Stitch Belt-Fastener, of which the following is a specification:

The object of my invention is to securely join or fasten together pieces A A' of leather or other material, in making and repairing machine-belting, by the combination in a solid eye and lock-stitch belt fastener; in the combination of a lock-stitch stock, H, with twist shanks $h$, formed of wire or metallic thread, and a tongue, I. My invention also consists in the combination, with the metallic parts of a belt-coupling, of a welt of leather or other yielding material, to form an even surface upon the inner side of the coupled portions of the belt.

Figure 1:
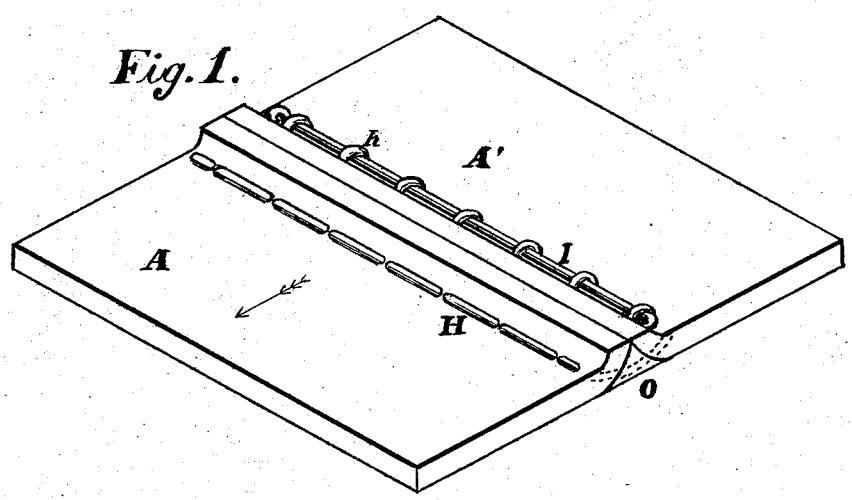
Figure 2:
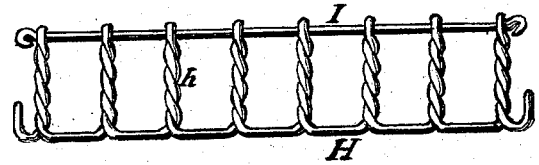

In the accompanying drawings, Figure 1 represents my improved coupling in use with the welt in place. Fig. 2 represents the lock-stitch stock or wire coupling, and Fig. 3 illustrates a modification which may be used in combination with the welt.

Figure 3:
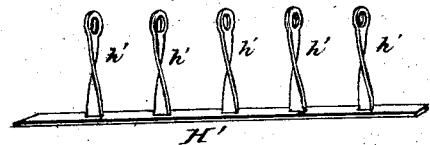

The lock-stitch stock H is formed from wire, as shown in Figure 3, by bending the length at right angles, and then doubling and returning it upon itself, and when it reaches the point of the first bend, again bending it, and continuing it in line with the original length for a sufficient distance to form a stitch, when the operation is repeated. In this manner are formed a series of loops starting from an essentially straight back or vertebra, and these loops being twisted complete the device, each of them having a closed eye at its point to receive the rod I. The shanks $h\ h'$ are slipped into slightly oblique holes in the ends of the belt A A', and into holes in the welt O. The tongue I is placed in the eyes of the shanks $h\ h'$, and the ends may be turned or hooked to stiffen them, and thus prevent the possibility of their turning up so as to come in contact with the hand or instrument in shifting or shipping the belt.

To shorten the belt, the tongue is drawn out of the eyes, new holes are cut in the tongue end of the belt, and the operation of joining repeated.

In using those fasteners into which any of the metallic parts come in contact with the surface of the pulley, the belt will, when at work, run ahead of the pulley as the joint passes over it, causing additional strain on the joint in again bringing up the motion of the pulley to that of the belt.

It is evident that, in combining with a metallic coupling the welt to make an even surface, the requisite flexibility and strength are obtained, and, as experience has shown, the above-mentioned difficulties are effectually overcome.

I claim as my invention—

1. A belt fastener or lock-stitch stock, H, formed of wire, with twisted shanks $h$, and closed eyes, substantially as described.

2. The combination, with a metallic belt-fastener, of the welt O, as and for the purposes set forth.

3. The combination of the lock-stitch or twisted-wire stock H, with the rod I, substantially as described.

J. B. McELROY.

Witnesses:
W. F. LIPPITT,
B. C. WASHINGTON.